A. L. WERTHEIM.
SELF LEVELING COT, BUNK, COUCH, AND THE LIKE, FOR USE ON SHIPBOARD.
APPLICATION FILED JUNE 20, 1910.
986,108.
Patented Mar. 7, 1911.
2 SHEETS—SHEET 1.
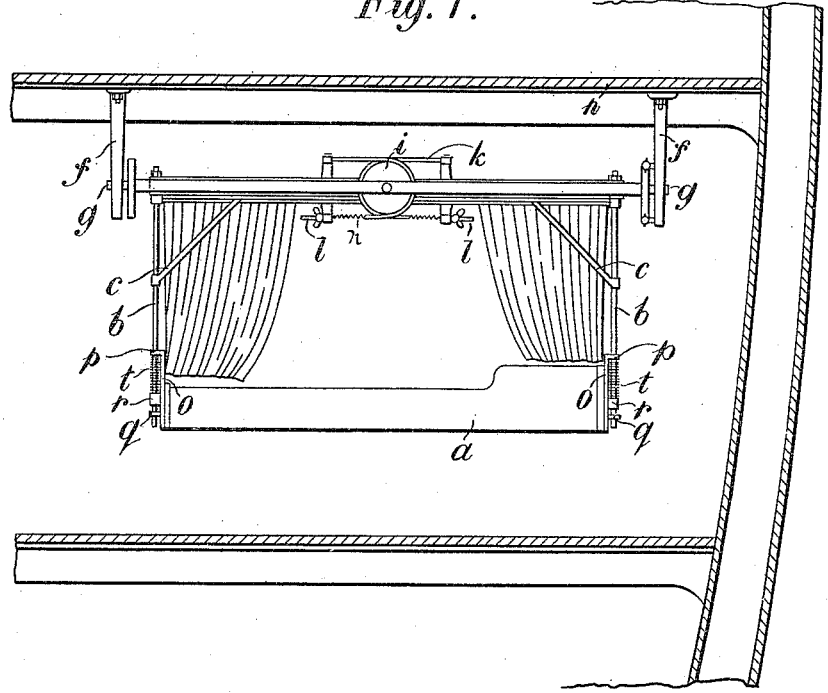
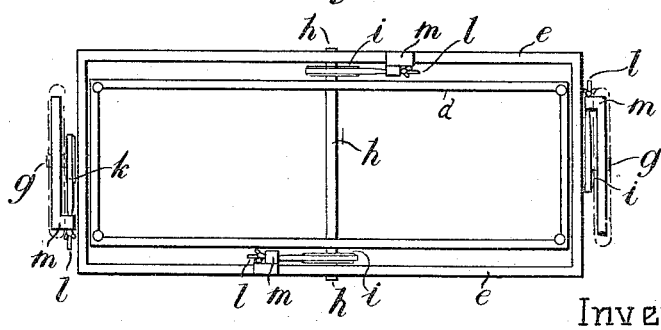
Witnesses
Howard F. Costello.
Irv. L. McCathran.
Inventor
Anne L. Wertheim
By E. E. Vrooman,
Attorney.

A. L. WERTHEIM.
SELF LEVELING COT, BUNK, COUCH, AND THE LIKE, FOR USE ON SHIPBOARD.
APPLICATION FILED JUNE 20, 1910.
986,108.
Patented Mar. 7, 1911.
2 SHEETS—SHEET 2.
Fig. 3.
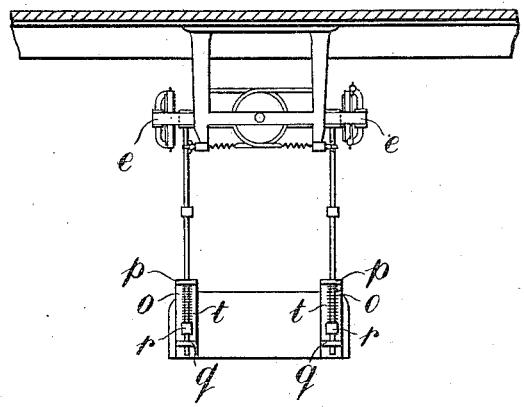
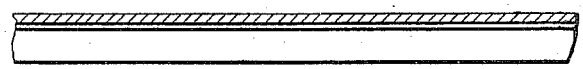
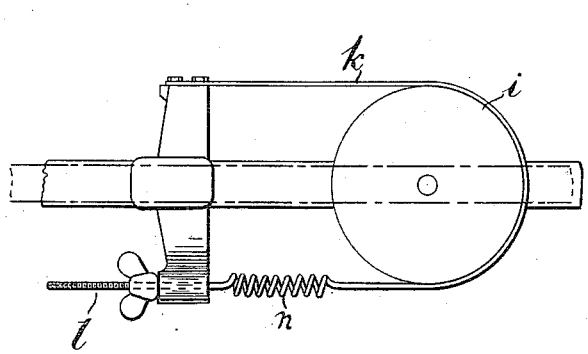
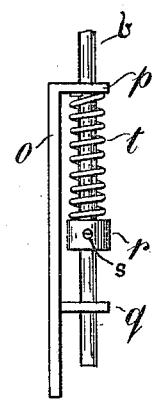
Fig. 4.
Fig. 5.
Witnesses
Howard F. Costello
Jno. L. McGathran
Inventor
Anne L. Wertheim
By E. E. Vrooman,
Attorney.

UNITED STATES PATENT OFFICE.

ANNE LÖWENSTEIN WERTHEIM, OF LONDON, ENGLAND.

SELF-LEVELING COT, BUNK, COUCH, AND THE LIKE, FOR USE ON SHIPBOARD.

986,108. Specification of Letters Patent. Patented Mar. 7, 1911.

Application filed June 20, 1910. Serial No. 567,937.

*To all whom it may concern:*

Be it known that I, ANNE LÖWENSTEIN WERTHEIM, a Princess of the German Empire, 8 Upper Belgrave street, London, S. W., England, have invented new and useful Improvements in Connection with Self-Leveling Cots, Bunks, Couches, and the Like, for Use on Shipboard; and I do hereby declare that the following is a full, clear, and exact description of the same, reference being had to the accompanying drawings, forming a part hereof.

This invention relates to self leveling cots, bunks, couches and the like, for use on shipboard, and refers particularly to bunks and the like which are suspended from above in gimbals, and the invention consists in providing means for more perfectly controlling the movements of the berth while an extremely delicate range of friction on the bearing parts is obtained.

In accordance with this invention, and for the purpose of maintaining the cot, bunk, or the like, (suspended from gimbals) steady, notwithstanding any rolling or pitching of the ship, I fit a brake to each of the trunnions of the gimbals. The said brake consists of a friction wheel mounted on the trunnion with an elastic brake band passed around it having one of its ends fixed to the under side of the gimbal frame and the other end connected to a screwed wire passing through a hole in a bracket on the upper side of the gimbal frame or cabin wall or ceiling. A spring is interposed between, and connects the ends of, the band and the screwed wire to provide greater sensitiveness.

To further assist in maintaining the level of the cot or the like I fix at each of the four corners of such cot or the like a bracket taking the form of a flat bar vertically arranged against the ends of the said cot or the like and having its upper end bent outward at right angles. The horizontal portion, thus formed, of the bracket is bored to permit a vertical rod connected at its upper end to the top framing of the cot or the like to slide therethrough, and below the aforesaid horizontal portion of the bracket I screw a ring into the vertical part of the bracket which forms a guide for the tail end of the rod. Between the horizontal part of the bracket and the ring, below it, I affix a collar on the rod, adjustable in a required position by means of a set screw, and between such collar and the underside of the horizontal portion of the bracket I interpose a spring arranged spirally around the rod so as to form a cushion to absorb shocks and vibrations or movements of the rod. And in order that my invention may be fully understood I will now proceed to describe the same with reference to the accompanying drawings and figures and letters of reference marked thereon, that is to say:—

Figure 1 is a side elevational view of a ship's cot fitted with my improvements. Fig. 2 is a plan, and Fig. 3 an end elevation of the same. Fig. 4 is a detail view showing in elevation the arrangement of band brake upon the gimbal trunnion, and Fig. 5 a detail showing one of the corner brackets in side view.

Similar letters of reference indicate like parts in all the figures.

$a$ is the cot or bunk and $b$, $b$, are the vertical rods connecting the same to the gimbal frame.

$c$, $c$, are stay rods bracing the rods $b$ together.

$d$ is the inner gimbal frame from which the cot $a$ is suspended by the rods $b$ and $e$ is the outer gimbal frame, while $f$ is the outer timber frame in which the gimbal frames are mounted.

$g$ are the trunnions by which the outer gimbal frame $e$ is supported in the frame $f$, and $h$, are the trunnions supporting the inner gimbal frame $d$ to the outer gimbal frame $e$.

Each of the gimbal trunnions is for the purpose of this invention fitted with a band brake constructed and arranged in the following manner:—A friction wheel $i$ is mounted on the trunnion and an elastic brake band $k$ is passed around the said wheel $i$. One of the ends of this band $k$ is fixed to the gimbal frame and the other end is connected to a screwed wire $l$ which wire is passed through a hole in the bracket $m$ on the gimbal frame or cabin wall or ceiling. $n$ is a spring interposed between, and connecting, the ends of the band $k$ and the wire $l$ to provide greater sensitiveness.

With the object of further assisting to maintain the level of the cot, swung in gimbals as aforesaid, I in addition to fitting the gimbal trunnions with band brakes in the manner above described fix at each of the four corners of the cot $a$ a bracket taking the form of a flat bar $o$ vertically arranged against the ends of the said cot and having its upper end *p* bent outward at right angles and bored to permit the rod *b* to slide therethrough.

*q* is a ring screwed into the vertical part *o* of the bracket to form a guide for the tail end of the rod *b*. Between the horizontal part *p* of the bracket and the ring *q* I fix a collar *r* on the rod *b* adjustable in position by means of the set screw *s* and between the collar *r* and the underside of the horizontal portion *p* of the bracket I interpose a spring *t* spirally arranged around the rod *b* so as form a cushion to absorb shocks from vibration or movements of the rod *b*.

What I claim as my invention and desire to secure by Letters Patent is:—

1. A bunk comprising a set of timber frames, a gimbal frame, a cot suspended from said gimbal frame, said cot comprising a body portion, a bracket secured to each corner of said body portion, a plurality of supporting bars, one of said supporting bars passing through each of said brackets, a spring mounted upon said bar, and an adjusting collar mounted upon said bar to adjust said spring.

2. A bunk comprising a set of supporting frames, an outer gimbal frame, axles pivotally mounting said gimbal frames from said supporting frame, an inner gimbal frame, an axle pivotally mounting said inner gimbal frame within said outer gimbal frame, pulleys mounted upon said axles, brake bands passing around each of said pulleys, the brake band mounted upon each of said pulleys extending in an opposite direction to the brake band mounted upon the opposite one of said pulleys, and a bunk suspended from said inner gimbal frame.

In testimony whereof I affix my signature in presence of two witnesses.

ANNE LÖWENSTEIN WERTHEIM.

Witnesses:
PERCIVAL HENRY CARTER,
GEORGE HUGHES.

---

Copies of this patent may be obtained for five cents each, by addressing the "Commissioner of Patents, Washington, D. C."